US009062607B2

(12) United States Patent
Hansson

(10) Patent No.: US 9,062,607 B2
(45) Date of Patent: Jun. 23, 2015

(54) METHOD OF OPERATING A GAS TURBINE POWER PLANT AND GAS TURBINE POWER PLANT

(75) Inventor: Hans-Erik Hansson, Finspang (SE)

(73) Assignee: EURO-TURBINE AB, Finspang (SE)

( * ) Notice: Subject to any disclaimer, the term of this patent is extended or adjusted under 35 U.S.C. 154(b) by 783 days.

(21) Appl. No.: 13/203,047

(22) PCT Filed: Feb. 24, 2010

(86) PCT No.: PCT/SE2010/000041
§ 371 (c)(1),
(2), (4) Date: Aug. 24, 2011

(87) PCT Pub. No.: WO2010/098709
PCT Pub. Date: Sep. 2, 2010

(65) Prior Publication Data
US 2011/0302926 A1 Dec. 15, 2011

(30) Foreign Application Priority Data

Feb. 24, 2009 (SE) ........................................ 0900236

(51) Int. Cl.
F02C 6/18 (2006.01)
F02C 7/143 (2006.01)
(Continued)

(52) U.S. Cl.
CPC ............... F02C 7/143 (2013.01); F01K 17/025 (2013.01); F01K 21/047 (2013.01); F02C 3/10 (2013.01); F02C 3/305 (2013.01)

(58) Field of Classification Search
CPC ..... F01K 21/047; F01K 17/025; F02C 7/143; F02C 3/305; F02C 3/10

USPC ........... 60/39.5, 39.55, 792, 775, 728, 39.182
See application file for complete search history.

(56) References Cited

U.S. PATENT DOCUMENTS 4,509,324 A     4/1985  Urbach
4,896,499 A *   1/1990  Rice ................................ 60/792
(Continued)

FOREIGN PATENT DOCUMENTS

EP      0319699     10/1988
EP      1039115     11/2003
(Continued)

OTHER PUBLICATIONS

Written Opinion of the ISA mailed on Feb. 6, 2010 for International Application No. PCT/SE2010/000041.
(Continued)

Primary Examiner — William H Rodriguez
(74) Attorney, Agent, or Firm — Pearne & Gordon LLP

(57) ABSTRACT

A method of operating a gas turbine power plant with a first gas turbine group, including a first turbine assembly, and a second gas turbine group, including a compressor assembly and a second turbine assembly which are mechanically coupled to one another, and useful work is extracted by a device being included in the plant, where a flue gas stream is produced by a combustion device, which is placed in a gas flow stream upstream of the second turbine assembly, where the second turbine assembly and compressor assembly are balanced to each other such that work produced by the second turbine assembly is consumed by the compressor assembly, and where the first turbine assembly is balanced to the device for the extraction of useful work such that work produced by the first turbine assembly is consumed by the device for the extraction of useful work.

28 Claims, 3 Drawing Sheets

(51) Int. Cl.
*F01K 21/04* (2006.01)
*F02C 3/10* (2006.01)
*F02C 3/30* (2006.01)
*F01K 17/02* (2006.01)

(56) References Cited

U.S. PATENT DOCUMENTS

| | | | | |
|---|---|---|---|---|
| 5,133,180 | A * | 7/1992 | Horner et al. | 60/39.12 |
| 6,145,296 | A | 11/2000 | Rakhmailov | |
| 7,770,376 | B1 * | 8/2010 | Brostmeyer | 60/39.182 |
| 8,104,259 | B2 * | 1/2012 | Joshi et al. | 60/39.5 |
| 2005/0262848 | A1 * | 12/2005 | Joshi et al. | 60/772 |
| 2008/0104939 | A1 * | 5/2008 | Hoffmann et al. | 60/39.5 |
| 2009/0071166 | A1 * | 3/2009 | Hagen et al. | 60/775 |
| 2012/0017597 | A1 * | 1/2012 | Freund et al. | 60/772 |
| 2013/0000316 | A1 * | 1/2013 | Nanataki et al. | 60/773 |
| 2013/0074511 | A1 * | 3/2013 | Tanaeva et al. | 60/772 |
| 2013/0118146 | A1 * | 5/2013 | Nanataki et al. | 60/39.182 |

FOREIGN PATENT DOCUMENTS

| | | |
|---|---|---|
| EP | 1600615 | 5/2011 |
| WO | 8604957 | 8/1986 |
| WO | 2004106718 | 12/2004 |

OTHER PUBLICATIONS

International Search Report for International Application No. PCT/SE2010/000041 completed on May 31, 2010, and mailed on Feb. 6, 2010.

* cited by examiner

METHOD OF OPERATING A GAS TURBINE POWER PLANT AND GAS TURBINE POWER PLANT

CROSS-REFERENCES TO RELATED APPLICATIONS

This application claims the benefit of PCT application number PCT/SE2010/000041 filed on Feb. 24, 2010 and incorporated herein by reference, which claims the benefit of foreign application number SE 0900236-1 filed on Feb. 24, 2009, also incorporated herein by reference.

FIELD OF THE INVENTION

The invention concerns a method of operating a gas turbine power plant according to the preamble of claim 1. The invention also concerns a gas turbine power plant according to the preamble of claim 17.

BACKGROUND OF THE INVENTION

EP 1600 615 discloses such a method and such a gas turbine power plant even though the document is focused on an intercooler system. The second turbine and compressor assemblies are connected to each other such that all work produced by the second turbine assembly is consumed by the compressor assembly. The first turbine assembly is further connected to the device for the extraction of useful work such that all work produced by the first turbine assembly is consumed by the device for the extraction of useful work.

WO 2004/106718 (Euroturbine AB) is also referred to.

AIM AND MOST IMPORTANT FEATURES OF THE INVENTION

According to the present invention there is provided a further development focusing on enhanced economy, firstly in respect of the power plant itself and secondly in respect of the possibility of extracting even more useful work per plant unit as well as per unit used fuel.

These aims are addressed according to the present invention.

When process steam is heated from a process gas stream downstream of the first turbine assembly, it has been made possible to combine steam generation with energy recovery. Further, at least a part of water contents in flue gases is used as process steam. These aspects are in contrast to the background art, wherein, firstly, no energy recovery is disclosed and, secondly, water contents in the flue gases is discharged into the atmosphere. It should be noted, that imagined water recovery in an arrangement according to EP 1600 615 would not give any useful result and gain worth taking into account.

When process steam is heated from a process gas stream downstream of the first turbine assembly and the produced steam is injected into a gas flow stream upstream of and/or in the combustion device in such amounts that at least 80% of the oxygen contents of the air in the gas flow stream is consumed through combustion, near stoichiometric conditions will prevail. Hereby, steam is used as working medium, which effectively reduces unnecessary compression work for compressing air which is not used for combustion.

This is in contrast to the background art according to EP 1600 615, wherein air is the main working medium and wherein small amounts of water being introduced into the process stream, but this mainly being for cooling purposes.

Combustion gas that is fed to the second turbine assembly has preferably advantageously a pressure of 50-300. The high steam contents in the process gas stream, as is provided in respect of the present invention, makes i.a. the combustion process more easily controllable and enhances efficiency even at this high pressure range and associated high temperatures prevailing in a process according to the present invention.

Preferably, the pressure in the outlet from the second turbine assembly has a pressure of about 5-50 bar.

It is advantageous when a first gas stream is compressed by a first compressor unit of said compressor assembly, thereafter brought to at least a second compressor unit of said compressor assembly. In particular, the first gas stream after the first compressor unit and before the second compressor unit is brought to a heat exchanger for cooling said first gas stream and heating said process steam.

Preferably, the flue gas stream is produced in a co-axial combustion device and led axially into the second turbine assembly. More preferred the gas flow stream from the second turbine assembly exits between the second turbine assembly and the second compressor assembly. The gas flow stream from the second turbine assembly is preferably led without essential angular deviation to an axial inlet to the first turbine assembly. When said compressor assembly has a first and a second compressor unit, it is preferred that the second turbine assembly has a first and a second turbine unit, wherein the first compressor unit is rotationally driven by the second turbine unit over a first hollow shaft and the second compressor unit is rotationally driven by the first turbine unit over a second shaft. In an advantageous aspect, a gas flow stream from the second turbine assembly is led without essential angular deviation to an axial inlet to the first turbine assembly by a central axis of the first turbine assembly forming an angle with a central axis of the second turbine assembly. Preferably this angle is acute and more preferably the angle is between 35° and 60°.

Preferably the gas is let into the first turbine assembly at a first axial end thereof being free from any extending shafts. A shaft connecting the first turbine assembly with the device for extracting useful work from the plant extends preferably from a second axial end of the turbine assembly, being opposite to the inlet side at the first axial end.

It is advantageous when steam is used for cooling high temperature exposed components of the plant and that at least a part of said steam is thereafter introduced into the gas stream, preferably in the combustion device, for further use as working fluid.

Altogether, the method according to the invention is made more simple and is more easily controlled. Through the invention it is further achieved that the second turbine group will become more independent from the first turbine group.

Since the second turbine group shaft(s) are not connected to any generator having fixed speed, the second turbine group can be free to adjust to prevailing conditions of the plant. This will result in new conditions of freedom which can result in improved performance of the plant, in particular in respect of part-load conditions.

Large gas turbines (more than 200 MW) can not effectively be provided with a transmission including a gearbox, because of limitations in work to be transferred. For very large plants it is therefore particularly advantageous that the compressor work is essentially transferred to the second turbine group whereby the high pressure turbine in that group substantially only drives the compressor of the entire plant and that the low pressure turbine which is present in the first turbine group essentially only drives the device for the extraction of useful work such as an electric generator.

One advantageous result in some embodiments of the invention is that the temperature in a cross-over duct upstream of the first group turbine will be reduced, which can be achieved by extended expansion in the second turbine group turbine. The more work being performed by the compressor of the second group, the longer the expansion line will be in the turbine of the second group and thereby the lower the temperature after that turbine—in the cross-over duct between the turbine groups. Alternatively this gives a potential to increase combustion temperature without causing any significant raise in cross-over duct temperature. The cross-over duct is a relatively complex design and lowering cross-over temperature is advantageous because a lower temperature will reduce design problems and/or reduce cost due to requirement for more expensive materials. Further, the first group turbine can be designed to have a rotational speed allowing perfect match with the generator, e.g. 1500 rpm, 3000 rpm etc depending on the type and requirements that prevail.

Generally speaking, the second turbine and compressor assemblies are balanced to each other such that all work produced by the second turbine assembly is consumed by the compressor assembly. Hereby the plant is simplified and any requirement on the first turbine group to provide important compressor capacity is eliminated.

Further, generally, the first turbine assembly is balanced to the device for the extraction of useful work whereby at least essentially all work produced by the first turbine assembly is consumed by the device for the extraction of useful work. This is advantageous in that in practice, according to the invention, only the first turbine group is connected to an electric generator or the like. Hereby any problems with a gear transmission in case of a conventional generator also being connected to the second group can be avoided. In particular, the first turbine group mostly runs slower than the second group, which for large machines makes it possible to connect the generator directly to the turbine without any gearbox in-between.

The invention also gives the possibility of enhanced flow geometry and pressure performance for the second group compressor assembly. Because of high pressure and low volumetric flow requirements it is preferred that this final compressor unit is of radial type. By this invention no central shaft is required for power extraction. Geometry conditions for the air entry to this radial compressor can therefore be more favorable which improves the performance of the compressor assembly.

When, according to an advantageous aspect of this invention, a first gas stream is compressed by a first compressor unit of said compressor assembly, thereafter brought to a heat exchanger for cooling said first gas stream and heating said process steam and thereafter brought to a second compressor unit of said compressor assembly, there is provided a natural and effective possibility of intermediate cooling of the compressor air, providing the possibility of enhanced flow geometry pressure performance for the compressor assembly.

It is particularly preferred that all useful work extracted for the plant is extracted from the first gas turbine group which on the one hand provides best working conditions for the first turbine in respect of the device for extracting useful work. Thereby arrangements for connecting a further device for extracting work to the second group can advantageously be dispensed with. Altogether the invention provides an economic and highly efficient solution for a gas turbine power plant.

It is also the case that all gas compression work for the plant is performed by said compressor assembly of the second turbine group. This reduces the complexity of the entire plant and opens for advantageous arrangement of the turbine groups relative to each other.

Having a part of water contents in flue gases being used as process feed water, allows recovery with certain excess, because of formation of water during the combustion.

The invention also concerns a power plant and the corresponding features and advantages are obtained in respect of claims directed thereto.

Due to the invention it is preferred that the flue gas stream is produced in a co-axial combustion device and brought axially into the second turbine group turbine since this further reduces the complexity of the plant and in particular the inlet of the turbine, and allows the use of a more uncomplicated combustion device.

In previous gas turbine design it has been aimed at creating a combustion device which produces high temperatures and efficient temperature distribution in the inside and in gas exiting from the combustor and to produce low emissions from the combustor. This has often resulted in very complicated combustor design, mainly because of geometrical limitations resulting from the gas turbine structure itself. In particular because of the requirement for a central shaft for transfer of mechanical work from turbine to compressor there is a requirement for burner locations spaced around the circumference of the turbine inlet. This has resulted in either annular or multi-can designs. Gas turbine combustors according to the background art thus will encircle the engine.

Most disturbing has been, the fact that the combustor and the first stages of the turbine are the components most subject to maintenance because of high temperatures and pressures. These components are because of their complexity expensive to service and replace.

When said compressor assembly has a first and a second compressor unit, it is particularly preferred that the second turbine group turbine has a first and a second turbine unit, wherein the first compressor unit is rotationally driven by the second turbine unit by a hollow first shaft and the second compressor unit is rotationally driven by the first turbine unit by a second shaft since this arrangement simplifies control and opens for easy independent regulation of the respective steps. In particular the first and second shafts should be co-axial with the first hollow shaft partly surrounding the second shaft.

As a definition, the gas flow enters the first compressor unit first and thereafter the second compressor unit. The corresponding goes for a turbine having a first and a second turbine unit, wherein the gas flow enters the first turbine unit first and thereafter the second turbine unit.

A particularly beneficial arrangement of the two groups in respect of each other is obtained when the axis of the first turbine group forms an angle with the axis (axes) of the second turbine group, since hereby i. a. the flow paths can be arranged for reduced flow resistance. It is preferred that the gas flow stream exiting from the second turbine is led without essential angular deviation to an axial inlet to the first turbine.

Said compressor assembly can also include further compressor units beside the first and the second compressor units.

BRIEF DESCRIPTION OF THE DRAWINGS

The invention will now be described in more detail by way of embodiments and with reference to the annexed drawings, wherein.

DESCRIPTION OF EMBODIMENTS

Figure 1:
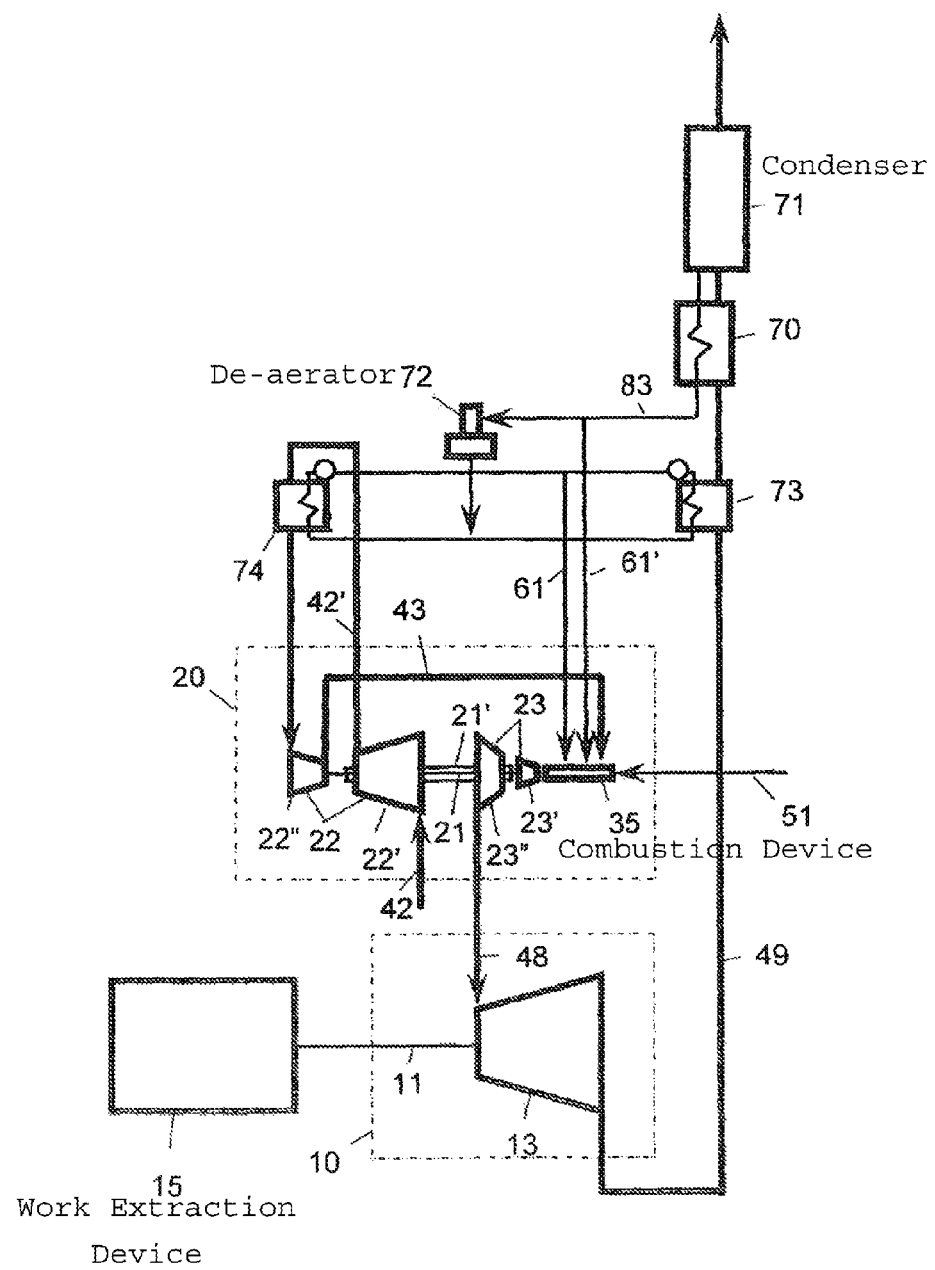
FIG. 1 shows diagrammatically a power plant according to the invention in a first embodiment.

In the power plant according to the invention the second gas turbine group works in a temperature range where cooling is required and can be advantageously provided by utilising steam. The steam may participate in this process in a very advantageous way by first cooling high temperature exposed components before being introduced to a combustion chamber of the combustion device. Thereby, this steam may also participate in the expansion process and provide additional work. However, a part of the steam is used for film cooling of parts where convection cooling does not give the necessary effect. This film cooling, where the steam acts as a protective layer between the gas stream and the metal, is very effective when using steam due to steam's higher heat capacity compared to air.

The first gas turbine group will work with conditions that do not require, or at most, only requires a limited amount of cooling. The distribution of cooling air in a corresponding "dry" design of such a turbine group may therefore be drastically reduced and instead allow a larger flow of working fluid in the turbine.

The optimal efficiency for a dry process, i. e., for a traditional gas turbine cycle, is obtained at the relatively low pressure ratios of 5-40 bar. However, the optimal efficiency is at much higher pressure ratios for a steam injected cycle. Consequently, it is important to increase the pressure ratio in steam injected gas turbine cycles in order to reach the optimal operating conditions. A suitable pressure region for the inventive power plant is 30-300 bar and preferably 50-300 bar. Combustor temperature levels are between 1200-2400 K, preferably 1400-2200 K.

In certain steam injected cycle configurations, the addition of water in the form of steam can be so great that combustion occurs as close to stoichiometric conditions as practically possible, i. e., nearly all oxygen contained in the air is utilised. This is one of the most primary objectives when operating the inventive power plant.

Combustion at near-stoichiometric conditions leads to an effective, compact and cost-effective power plant. The water which has participated in the process is not emitted to the environment, but can be recycled through flue gas condensation. The condensate obtained can be continuously treated and re-circulated to the power cycle. The process of flue gas condensing is simplified by near-stoichiometric combustion because the dew point is very high during such conditions and the cycle may be made water self-sufficient. Condensing water from the flue gas also helps to remove particles and, to some degree, contaminants from the flue gases. Hence, the least possible environmental impact is obtained. Near-stoichiometric combustion also implies that the flue gas flow to the environment is minimized.

The plant operation should be designed such that at least 80%, and preferably at least 90% of the oxygen content of the intake air is consumed. This represents a major deviation from the existing technology and gives the advantages named above.

The net result of introducing steam into the traditional gas turbine process is to increase the efficiency and output of useful work. Well-developed steam injected gas turbine cycles that operate with similar pressure and temperature levels as existing technology usually obtain efficiencies of approximately 50-55%. Highly steam injected cycles that operate with higher pressure levels obtain efficiencies around 55-60% and useful work extracted will be 2-3 times higher than its corresponding conventional gas turbine process.

According to the invention the pressure in the outlet from the second turbine assembly has a pressure of about 5-50 bar and most preferred a pressure between 10-40 bar. This is the pressure at the inlet of the first turbine assembly and constitutes the pressure drop over said first turbine assembly.

In order for the cycle to operate efficiently and feasibly with the pressure ratios required to reach 50-300 bar, at least two, or for the highest pressure levels, three shafts with differing rotational speeds should be used in the compressor assembly of the second turbine group. The high-pressure compressor and turbine would operate with the higher rotational speed.

Hence, a multiple-shaft solution would comprise a conventional gas turbine assembly operating on one shaft, a second compressor assembly and turbine assembly operating on separate shafts that rotates at higher speeds, and a combustion chamber which works at high pressures and temperatures, with near-stoichiometric combustion. Steam can also be introduced through injecting high-pressure steam before the combustion chamber or through injecting intermediate-pressure steam prior to any of the compression stages.

When operating at higher pressures, the need to cool the air between the compressor units increases; on the one hand to reduce the temperature level and material demands in the compressor, and on the other hand to reduce the amount of compressor work required.

Lowering the temperature of the compressed air can also lead to more advantageous conditions for combustion. The easiest way to reach lower temperatures is to spray water into the compressed air stream. Alternatively, the heat contained in the compressed air can be utilised to produce steam in a boiler.

FIG. 1 diagrammatically shows a gas turbine power plant according to the invention which includes a first 10 and a second 20 gas turbine group. The first gas turbine group 10 includes a first turbine assembly 13 which is rotationally connected over a shaft 11 to a device 15 for extracting useful work such as an electric generator or the like.

A second gas turbine group 20 includes a second turbine assembly 23 which is comprised of a first turbine unit 23' and a second turbine unit 23". The second gas turbine group 20 also includes a compressor assembly 22, which in turn is comprised of a first compressor unit 22' and a second compressor unit 22".

The first compressor unit 22' is rotationally connected to the second turbine unit 23" over a first, hollow, shaft 21', which partly surrounds a second shaft 21, which in turn rotationally connects the second compressor unit 22" with the first turbine unit 23'. An air inlet to the first compressor unit is indicated with 42 and after exit from the first compressor unit, the compressed air is led over a conduit 42' to the inlet of the second compressor unit 22". Further, there is positioned between the first and the second compressor units an air cooler 74 in the form of a heat exchanger which is used to produce steam for injection into the system as will be described below. As an alternative, the second gas turbine assembly may include three turbine units, each one being rotationally connected to respective one of three compressor units being included in the compressor assembly. Three connecting shafts for the three respective steps are in that case co-axial corresponding to the two shaft alternative mentioned above.

After the exit from the second compressor unit 22" the air is led over a conduit 43 to the inlet of a combustion device 35 which is arranged axially upstream of the first turbine unit 23' opposite to the compressor unit 22".

The combustion device 35 is co-axial and supplies flue gases to an axial inlet of the first turbine unit 23' of the second turbine assembly 23. Further, there are inlets to the combustion device 35 for steam 61 in order to provide a combustion process, wherein at least 80% of the oxygen contents in the air in the flow stream is consumed through combustion in the combustion device 35. Fuel is supplied to the combustion device 35 over the conduit 51.

The gases from the exit of the second turbine group turbine assembly 23 flow through the conduit 48 to the first turbine group turbine assembly 13, which in turn produces the useful work for the plant, which is extracted by the device 15 for extracting useful work which is an electric generator or the like.

The gases thereafter exit from the first turbine assembly 13 and flow through the conduit 49 to a further heat exchanger 73, which contribute to heating of steam for injection into the process through conduit 61.

After the heat exchanger 73 the flue gases pass through a heat exchanger 70 wherein condensate from a flow gas condenser 71 is heated before it is passed on to a de-aerator 72 over conduit 83.

Figure 2:
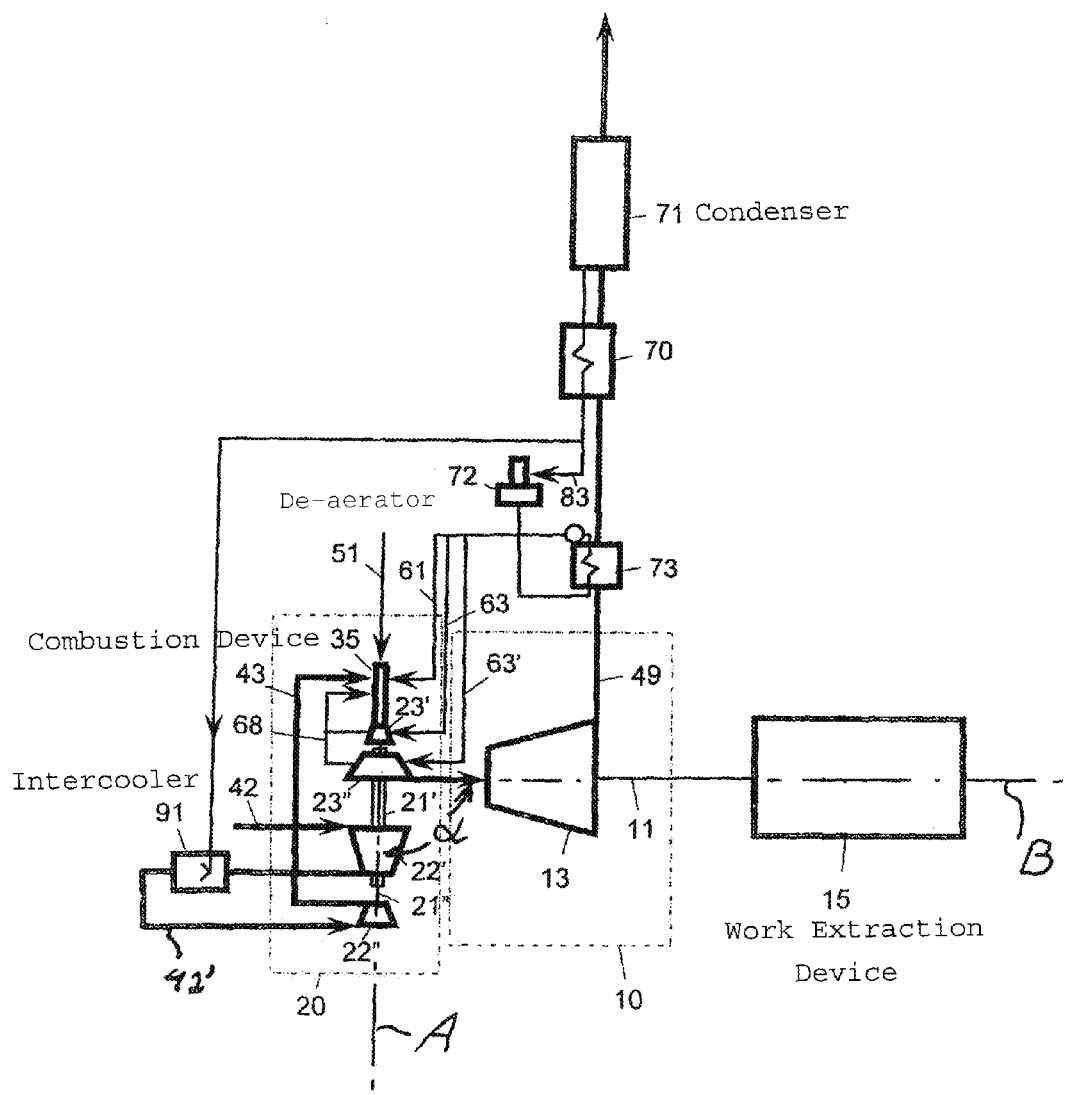
FIG. 2 shows diagrammatically a power plant according to the invention in a second embodiment.

FIG. 2 shows a second embodiment wherein same or like elements have the same reference numerals as in FIG. 1. One difference from the power plant according to FIG. 1 is that in the embodiment in FIG. 2, the central axis B of the first turbine assembly 13 forms an angle α with the central axis A of the elements of the second turbine group and in particular the second turbine assembly 23 such that said axes cross each other. This gives the advantage that the distance which the hot gases must flow in the duct between the exit of the second turbine assembly 23 and the inlet of the first turbine assembly 13 can be reduced and that difference in the flow direction in the duct can be reduced. Another difference is that a spray intercooler 91 is arranged in the conduit 42'.

Figure 3:
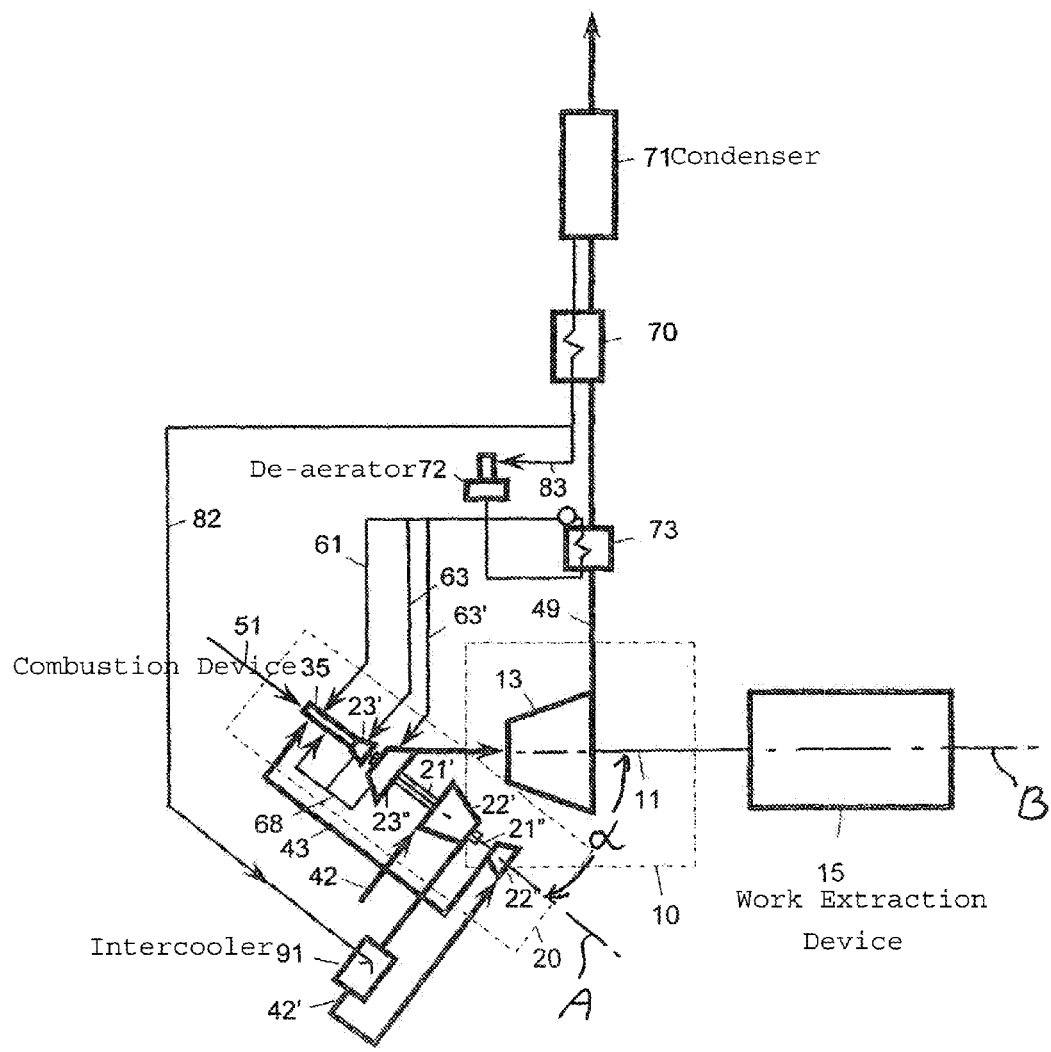
FIG. 3 shows diagrammatically a power plant according to the invention in a third embodiment.

Further, there are increased possibilities of providing a flow path which is more beneficial, since flow resistance and the complexity of the arrangement may be reduced. In the shown example α is 90°, but in order to further enhance efficiency and further reduce flow resistance between the second turbine assembly 23 and the first turbine assembly 13 it is possible to position the turbine groups such that a is an acute angle, between 35° and 60° for example about 45°, as is shown in FIG. 3. Hereby the outlet losses from the second turbine assembly 23 can be reduced further. Normally, the angle α is between 30° and 90°, but it is not excluded that the angle α is greater or smaller than that.

In FIGS. 2 and 3, there is shown that the inlet to the first turbine assembly 13 is at a first axial end thereof being free from any extending shafts being used neither for driving a compressor nor for driving a device for extracting useful work.

The first turbine assembly 13 indeed has a mechanical coupling to a device 15 for extracting useful work from the plant, such as an electric generator over a shaft 11. In this embodiment, however, the shaft 11 extends from a second axial end of the turbine assembly 13, being opposite to the inlet side at the first axial end, which is preferred according to this embodiment. This way, on the one hand the inlet to the first turbine assembly 13 can be arranged with preferred reduced resistance according to the above and without having to take into account any drive shafts extending at this end.

The invention can be modified within the scope of the claims. For example it is possible in certain applications to include another low power consumer such as an auxiliary device, in the first or the second turbine group. A device for extraction of minor amounts of useful work or the like can also in certain applications be coupled also to the second turbine group. These modifications are not, however, preferred.

It is also possible within the scope of the claims to add superheating in addition to steam in the flue gas and intermediate compressor flow path.

The second turbine group can be positioned and oriented in various ways in respect of the first turbine group. A second combustion device could in some applications be positioned as a so called re-heater after the second turbine and before the first turbine.

The invention claimed is:

1. A method of operating a gas turbine power plant with a first gas turbine group, including a first turbine assembly, and a second gas turbine group, including a compressor assembly and a second turbine assembly which are mechanically coupled to one another, and useful work is extracted by a device being included in the plant, wherein a flue gas stream is produced by a combustion device, which is placed in a gas flow stream upstream of the second turbine assembly, said method comprising the steps of:
   balancing said second turbine assembly and compressor assembly to each other such that at least essentially all work produced by the second turbine assembly is consumed by the compressor assembly;
   balancing the first turbine assembly to the device for the extraction of useful work such that at least essentially all work produced by the first turbine assembly is consumed by the device for the extraction of useful work;
   heating process steam from a process gas stream downstream of the first turbine assembly;
   using at least a part of water contents in flue gases as process steam;
   injecting the process steam into a gas flow stream upstream of and/or in the combustion device in such amounts that at least 80% of the oxygen contents of the air in the gas flow stream is consumed through combustion;
   leading a gas flow stream from the second turbine assembly without essential angular deviation to an axial inlet to the first turbine assembly by a central axis of the first turbine assembly forming a non-zero angle (α) with a central axis of the second turbine assembly, wherein
   combustion gas that is fed to the second turbine assembly has a pressure of 50-300 bar.

2. The method according to claim 1, wherein the pressure in the outlet from the second turbine assembly has a pressure of about 5-50 bar.

3. The method according to claim 1, wherein a first gas stream is compressed by a first compressor unit of said compressor assembly, thereafter brought to at least a second compressor unit of said compressor assembly.

4. The method according to claim 3, wherein the first gas stream after the first compressor unit and before the second compressor unit is brought to a heat exchanger for cooling said first gas stream and heating said process steam.

5. The method according to claim 1, wherein the flue gas stream is produced in a coaxial combustion device and led axially into the second turbine assembly.

6. The method according to claim 1, wherein the gas flow stream from the second turbine assembly exits between the second turbine assembly and the second compressor assembly.

7. The method according to claim 1, wherein said compressor assembly has a first and a second compressor unit, wherein the second turbine assembly has a first and a second turbine unit, wherein the first compressor unit is rotationally driven by the second turbine unit over a first hollow shaft and the second compressor unit is rotationally driven by the first turbine unit over a second shaft.

8. The method according to claim 7, wherein the compressor assembly has a third turbine unit which drives a third compressor unit over a third shaft.

9. The method according to claim 1, wherein the angle (α) is acute.

10. The method plant according to claim 1, wherein the angle (α) is between 35° and 60°.

11. The method plant according to claim 1, wherein the gas is let into the first turbine assembly at a first axial end thereof being free from any extending shafts.

12. The method according to claim 11, wherein a shaft connecting the first turbine assembly with the device for extracting useful work from the plant extends from a second axial end of the turbine assembly, being opposite to the inlet side at the first axial end.

13. The method according to claim 1, wherein steam is used for cooling high temperature exposed components of the plant, and that at least a part of said steam is thereafter introduced into the gas stream, in or upstream of the combustion device, for further use as working fluid.

14. The method according to claim 1, wherein the angle (α) is 90°.

15. The plant according to claim 1, wherein the angle (α) is 90°.

16. A gas turbine power plant comprising:
a first gas turbine group including a first turbine assembly;
a second gas turbine group including a compressor assembly and a second turbine assembly which are mechanically coupled to one another, wherein the second turbine group is placed such in relation to the first turbine assembly that the gas flow stream from the former is led without essential angular deviation to an axial inlet of the latter such that a central axis of the first turbine assembly forms a non-zero angle (α) with a central axis of the second turbine assembly, whereby the gas flow stream from the second turbine assembly is led without essential angular deviation to an axial inlet to the first turbine assembly;
a generator configured for extraction of useful work;
a burner configured for producing a flue gas stream placed in a gas flow stream upstream of the second turbine assembly, wherein said second turbine assembly and compressor assembly are balanced to each other such that at least essentially all work produced by the second turbine assembly is consumed by the compressor assembly, and wherein the first turbine assembly is balanced to the generator for the extraction of useful work such that at least essentially all work produced by the first turbine assembly is consumed by the generator for the extraction of useful work;
a heat exchanger arranged for heating process steam from a process gas stream downstream of the first turbine assembly,
a flue gas condenser arranged for recovering water contents in flue gases, said condenser being coupled for introducing at least a part of recovered water as process steam, and
a conduit arranged to inject the produced steam into a gas flow stream upstream of and/or in the burner with the conduit being arranged so as to inject steam in such amounts that at least 80% of the oxygen contents of the air in the gas flow stream is consumed through combustion, wherein
the plant is arranged to feed the combustion gas to the second turbine assembly at a pressure between 50 and 300 bar.

17. The plant according to claim 16, wherein the compressor assembly includes a first and a second compressor unit.

18. The plant according to claim 17, wherein a heat exchanger for cooling said first gas stream and heating said process steam is placed after the first compressor unit and before the second compressor unit.

19. The plant according to claim 18, wherein a co-axial combustion device is arranged for the producing the flue gas stream which is led axially into the second turbine assembly.

20. The plant according to claim 19, wherein the gas flow stream exit from the second turbine assembly is between the second turbine assembly and the second compressor assembly.

21. The plant according to claim 20, wherein said compressor assembly has a first and a second compressor unit, wherein the first turbine assembly has a first and a second turbine unit, wherein the first compressor unit is rotationally coupled to the second turbine unit over a first hollow shaft and the second compressor unit is rotationally coupled to the first turbine unit over a second shaft.

22. The plant according to claim 21, wherein the first turbine assembly has more than two turbine units and that the first compressor assembly has more than two compressor units.

23. The plant according to claim 22, wherein the first and further shafts are co-axial and that the further shaft is at least partially surrounded by the first shaft.

24. The plant according to claim 23, wherein the combustion device is positioned opposite to the compressor assembly in respect of the second turbine assembly.

25. The plant according to claim 16, wherein the angle (α) is an acute angle.

26. The plant according to claim 16, wherein the angle (α) is between 35° and 60°.

27. The plant according to claim 26, wherein the inlet to the first turbine assembly is at a first axial end thereof being free from any extending shafts.

28. The plant according to claim 27, wherein a shaft connecting the first turbine assembly with the device for extracting useful work from the plant extends from a second axial end of the turbine assembly, being opposite to the inlet side at the first axial end.

* * * * *